United States Patent [19]

Ijichi et al.

[11] 3,787,302

[45] Jan. 22, 1974

[54] PHOTO-SENSITIVE CROSS-LINKING AGENTS FOR HIGH MOLECULAR WEIGHT MATERIALS

[75] Inventors: Ichiro Ijichi; Sajiro Maeda; Satoru Kubo; Takamori Tomomoto, all of Osaka, Japan

[73] Assignee: Nitto Electric Industrial Co., Ltd., Osaka, Japan

[22] Filed: Oct. 19, 1970

[21] Appl. No.: 82,219

[52] U.S. Cl..... 204/159.2, 204/159.13, 204/159.14, 204/159.15, 204/159.16, 204/159.17, 204/159.19, 204/159.23, 204/160.1, 260/4 R, 260/827, 260/836, 260/844, 260/851, 260/856, 260/862, 260/878 R, 260/879, 260/883, 260/884, 260/885

[51] Int. Cl. ............................ B01j 1/10, C08f 1/20

[58] Field of Search....... 204/159.23, 159.14, 159.2, 204/159.13

[56] References Cited

UNITED STATES PATENTS

| | | | |
|---|---|---|---|
| 3,368,900 | 2/1968 | Burg | 204/159.23 |
| 3,450,615 | 6/1969 | Eldred et al. | 204/159.23 |
| 3,442,861 | 5/1969 | Hoegger | 260/64 |
| 3,419,462 | 12/1968 | Wehr | 161/198 |
| 2,484,529 | 10/1949 | Roedel | 204/159.14 |

FOREIGN PATENTS OR APPLICATIONS

| | | | |
|---|---|---|---|
| 665,813 | 7/1963 | Canada | 204/159.2 |

*Primary Examiner*—John C. Bleutge
*Attorney, Agent, or Firm*—Sughrue, Rothwell, Mion, Zinn & Macpeak

[57] ABSTRACT

The present invention provides novel photo-sensitive cross-linking agents for high molecular weight materials comprising aromatic polyaldehydes and derivatives thereof, of the formula:

CHO–R–CHO wherein R is an aromatic radical of the formulae:

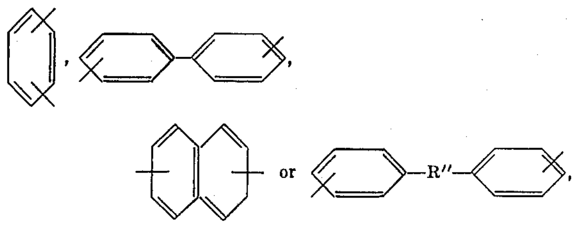

a divalent benzene ring, a substituted divalent benzene ring or a divalent polycyclic aromatic ring. The aforementioned formulae may be substituted by a variety of groups described hereinafter in the specification. However, ortho-dialdehydes are excluded from the scope of the present invention.

8 Claims, No Drawings

PHOTO-SENSITIVE CROSS-LINKING AGENTS FOR HIGH MOLECULAR WEIGHT MATERIALS

BACKGROUND OF THE INVENTION

1. Field of the Invention

The present invention relates to a process for modifying a high molecular weight compound or a product thereof by radiation with light, and more particularly, to a process for modifying a high molecular weight compound by incorporating therein a small amount of an aromatic polyaldehyde, or a derivative thereof, or a small amount of an aromatic polyaldehyde, or a derivative thereof, and a photo-active cross-linking agent and subjecting it to light radiation.

2. Description of the Prior Art

The primary object of the present invention is to improve the physiochemical and mechanical properties of high molecular weight compounds or shaped material made from such compounds, such as solvent resistance, mechanical characteristics, heat resistance, and electrical characteristics by conducting a cross-linking reaction by light radiation to form a three-dimensional network structure.

In general, in order to cross-link a high molecular weight material by the action of light, it is necessary that the material have a photosensitive group in its structure. However, conventional high molecular weight materials do not exhibit photosensitivity due to the lack of such a photosensitive group. Therefore, in order to render these high molecular weight materials photosensitive, it has been suggested to add a small amount of a photosensitizer to the compounds.

As well-known photo-sensitizers used for such a purpose, there are benzophenone and 2-methylanthraquinone. In addition, there are generally known other sensitizers such as aromatic carbonyl compounds such as chlorobenzophenone, dimethylbenzophenone, acetophenone, benzoin, and benzoylacetic acid; aromatic acids, acid amides, acid esters, salts and derivatives thereof, such as benzoic acid, benzamide, methyl benzoate, sodium benzoate, isophthalic acid, and the like; organic compounds containing a photosensitive halogen atom such as monochloroacetic acid, trichloroacetic acid, etc.; and aromatic aldehydes such as benzaldehyde, nitrobenzaldehyde, chlorobenzaldehyde and the like.

It is believed that such a photo-sensitizer is decomposed by absorbing light having wave lengths of 200–600 mμ to provide a free radical, which catches hydrogen from the high molecular weight compound to provide a polymer radical. The high molecular weight compound is cross-linked by the polymer radicals combining with each other.

However, although many sensitizers are known as mentioned above, very few have been utilized industrially, since when such sensitizers are added to high molecular weight compounds, the industrially-required cross-linking rate cannot be obtained, and further, when high molecular weight compounds are cross-linked by the action of light using such sensitizers, the properties, particularly the mechanical strength, of the high molecular weight compounds are reduced compared with the compounds before the cross-linking operation.

The present inventors have endeavored to develop sensitizers having industrially suitable properties without having the aforesaid disadvantages, and as a result thereof, it has been discovered that aromatic polyaldehydes and derivatives thereof are very effective for the above-mentioned purposes.

SUMMARY OF THE INVENTION

The present invention provides novel photo-sensitive cross-linking agents for high molecular weight materials comprising aromatic polyaldehydes and derivatives thereof, of the formula:

CHO–R–CHO wherein R is an aromatic radical of the formulae:

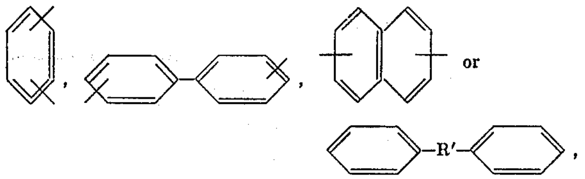

a divalent benzene ring, a substituted divalent benzene ring or a divalent polycyclic aromatic ring. The aforementioned formulae may be substituted by a variety of groups described hereinafter in the specification.

However, ortho-dialdehydes are excluded from the scope of the present invention.

DESCRIPTION OF THE PREFERRED EMBODIMENTS

The terminology "aromatic polyaldehydes and derivatives thereof" as used in the present invention indicates the following compounds; that is, compounds wherein at least two aldehyde groups are bonded to a divalent group as shown in formula (1)

CHO–R–CHO (1)

wherein R is a group represented by formulae (2), (3), (4) or (5), a divalent benzene ring or a substituted group thereof, or a divalent polycyclic aromatic ring.

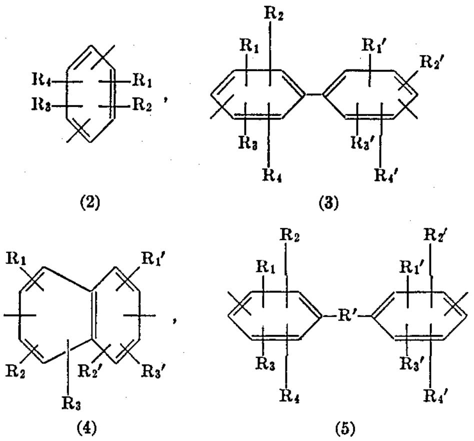

(2) (3) (4) (5)

wherein $R_1$–$R_4$ and $R_1'$–$R_4'$ each may be a monovalent group such as a hydrogen atom, an alkyl group, a nitro group or a halogen atom, or an aldehyde group. Furthermore, at least two of these groups may be substituted by divalent groups bonded by a bridged or a ring structure, such as, for example, groups having the following structures:

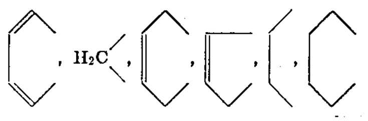

R' is a divalent group, for example, an alkylene chain having 1-3 carbon atoms, a silicon atom of a group such as

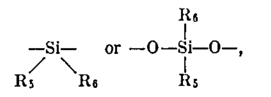

a phosphorus atom of a group such as

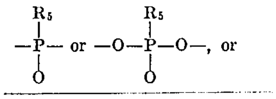

a sulfur atom of $-SO_2-$ wherein $R_5$ and $R_6$ are individually selected from the group consisting of —H, —X, $-CH_3$, $-C_2H_5$, $-C_6H_5$, $CH_2{=}CH-$, wherein X is a halogen atom.

As such divalent polycyclic aromatic rings, there may be illustrated aromatic heterocyclic groups having a cross-linked structure, wherein a carbon atom, an oxygen atom, a silicon atom or a phosphorus atom is the bridging atom, and substituted groups thereof, or directly bonded rings and substituted rings thereof such as biphenylene, naphthalene, and anthracene.

Examples of the aforesaid aromatic polyaldehydes and derivatives thereof are isophthaldialdehyde, terephthaldialdehyde, mesitylene trialdehyde, 2-methyl-terephthaldialdehyde, 3-methyl-terephthaldehyde, 2-chloroterephthaldialdehyde, 2,4-dimethylterephthaldialdehyde, 2-nitroisophthaldialdehyde, and also compounds having the following structures:

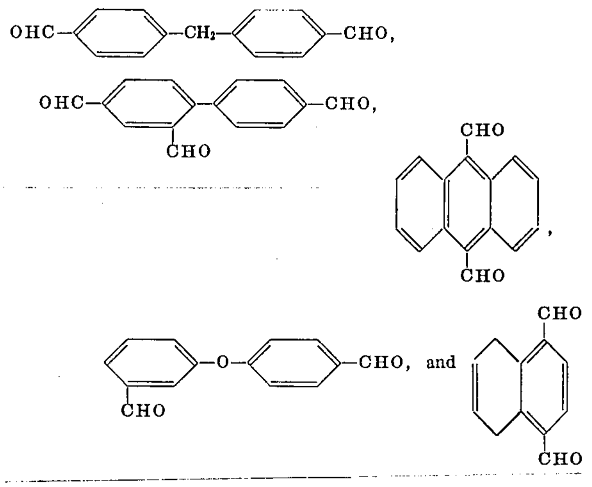

However, it has further been discovered that aromatic polyaldehydes and derivatives thereof in which the two aldehyde groups are disposed at contiguous positions, such as o-phthalaldehyde, are not effective sensitizers since the light absorbed by such polyaldehydes does not contribute to the cross-linkage and, further, they have the effect of releasing the absorbed light as light having longer wave lengths.

It has also been discovered that the aromatic polyaldehydes of the present invention are effective as sensitizers for effecting cross-linking by the action of light and when they are introduced into high molecular weight compounds, they maintain their sensitivity. That is, when the aromatic polyaldehydes are introduced into straight-chain high molecular weight compounds by means of copolymerization or condensation, the high molecular weight compounds also have sensitivity and when the photosensitive high molecular weight compounds are used as sensitizers, a uniform distribution of the sensitizing groups in the high molecular weight compounds to be cross-linked is obtained and the transfer of the sensitizer molecules in the high molecular weight compounds, as is usually observed in monomer sensitizers, can be prevented.

Any high molecular weight compound may be used as the high molecular weight compound which can be cross-linked by the action of light by incorporating therein the above-mentioned aromatic polyaldehydes as a sensitizer.

For example, there are illustrated such thermosetting high molecular weight compounds as unsaturated polyesters, alkyd resin, an epoxy resin, a phenol resin, a furan resin, a xylol resin, a urea-formaldehyde resin, a melamine resin, etc.; such thermoplastic high molecular weight compounds as polyolefins, e.g., polyethylene, polypropylene, an ethylenevinyl acetate copolymer, etc.; polystyrene, polyacrylates, polymethacrylates, a poly(acrylic acid-butyl acrylate) copolymer, polyvinyl chloride, polyvinylidene chloride, polyacrylonitrile, polycarbonates, polyesters, polyamides, polyurethanes, polyesters, etc.; and rubbery high molecular weight compounds such as natural rubbers, butyl rubbers, ethylene-propylene copolymer rubbers, styrene-butadiene copolymer rubbers, neoprene rubbers, etc.

It has also been found that silicon-polymers and fluorine-polymers such as polyvinylidene fluoride can be effectively used in this invention.

However, among certain fluorine-polymers, specifically, polytetrafluoroethylene in which all the hydrogen atoms bonded to the carbon atoms have been substituted with fluorine atoms, decomposition occurs rather than cross-linking. In addition, the sensitizers shown above have had compatibility with water-soluble polyvinyl alcoholic polymers. Therefore, when such polymers are employed, effective cross-linkage cannot be obtained.

The amount of the aromatic polyaldehyde to be added to the high molecular weight compound for cross-linking is 0.01–20 percent by weight, preferably 0.1–5 percent by weight, based on the weight of the high molecular weight compound. If the amount is lower than 0.01 percent, the cross-linking effect is less, while if the amount is higher than 20 percent by weight, the cost for the sensitizer is increased, the sensitizer combines with each other when the system is subjected to active light exposure, and, in addition, the permeability of active light through the cross-linking system is lowered, which results in a lowering of the cross-linking rate and a reduction in the properties of the high molecular weight compound after cross-linking.

The aromatic polyaldehydes of this invention may be incorporated in the high molecular weight compound to be cross-linked by various methods. Generally, any method by which the sensitizer is homogeneously mixed with the high molecular weight compound may be employed; specifically, by roll kneading or by adding the sensitizer to a solution of the high molecular weight compound in a suitable solvent or by immersing the high molecular weight compound in a solution of the sensitizer in a suitable solvent. It is clear to one of ordinary skill in the art that any suitable method may be employed.

The high molecular weight compound can be provided with photosensitivity by adding thereto only the aromatic polyaldehyde of the present invention. However, by further adding to the high molecular weight material a photoactive cross-linking agent shown below together with the aforesaid sensitizer, the cross-linking rate can be increased and the properties of the cross-linked high molecular weight compound can be improved.

Although the exact mechanism by which the photoactive cross-linking agent which may be used in this invention functions has not yet been determined, the photo-active cross-linking agent is a compound which is activated by absorbing energy from the sensitizer, whereby it contributes to the cross-linking of the high molecular weight compound.

Examples of such compounds are N,N'-hexamethylenebisacrylamide, N,N'-hexamethylenebismethacrylamide, 5-acrylamino-N-acrylocaproamide, ethyleneglycol dimethacrylate, and a polyethyleneglycoldimethacrylate such as triethyleneglycol dimethacrylate.

The amount of the photoactive cross-linking agent which may be employed is 1–50 percent by weight, preferably 5–10 percent by weight, based on the weight of the high molecular weight compound. If the amount added is lower than 1 percent by weight, the effect of addition is less and if the amount is higher than 50 percent by weight, the cross-linking density of the high molecular weight compound thus cross-linked is too high, and hence the elasticity and plasticity of the cross-linked product are reduced.

As the source for the light radiation, sun light, a low potential, high potential or super-high potential mercury lamp, a xenon lamp, a carbon arc and the like, which can emit light having wave lengths of 200–600 mμ may be utilized in the present invention. A low potential or high potential mercury lamp which is an ultraviolet source of light having wave lengths of 200–400 mμ is preferably used.

The present invention will now be explained by referring to a general embodiment thereof. That is, 0.01 percent by weight or more of the aromatic polyaldehyde of the present invention is first added to the high molecular weight compound or a solution thereof and then formed into a shaped article by means of casting, pressing or extruding.

Thereafter, by subjecting the shaped article to light radiation at room temperature or at a higher temperature, the shaped article can be sufficiently cross-linked and modified within from several seconds to several ten minutes.

The cross-linked high molecular weight compound obtained by the above method is not colored and the appearance thereof is the same as that of the compound before cross-linking. When the cross-linked material is immersed in a solvent, the material is not dissolved in the solvent and only the undissolved portion is swelled, which shows that the solvent resistance of the high molecular weight compound is remarkably improved.

On the other hand, as will be understood from the comparison examples shown below, a high molecular weight compound cross-linked using a conventional sensitizer such as benzophenone, 2-methylanthraquinone, benzaldehyde, etc., has an inferior cross-linking rate, inferior mechanical properties and a lower heat resistance.

It is not clear why these excellent results are obtained when the aromatic polyaldehydes of the present invention are used as compared with the use of conventional sensitizers, particularly aromatic monoaldehydes, but this is believed to be caused not only by the large proportion of aldehyde groups having photosensitivity but also by the way the sensitizer itself contributes to the cross-linkage. That is, as shown in the following reaction equation (1), the cross-linkage of a high molecular weight compound usually occurs by first forming a sensitizer radical R· by the decomposition of the sensitizer, and the polymer radicals formed by catching the hydrogen from the high molecular weight compound are combined again with each other.

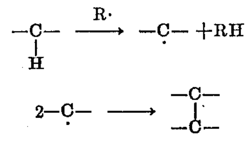
(1)

In addition to the above reaction, the following bonding reaction of the sensitizer radical R· and the polymer radical is considered to occur.

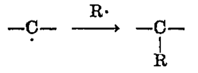
(2)

When a mono-functional monoaldehyde is used, the reaction shown in equation (2) occurs to reduce the proportion of the polymer radical and hence the rate of the cross-linking reaction by the combination of the polymer radicals with each other is reduced, and in addition the number of cross-linked points is reduced, whereby the increase of the mechanical strength and the heat resistance of the high molecular weight compound is obstructed.

On the other hand, in the case of using the polyfunctional aromatic polyaldehydes of the present invention, the sensitizing group grafted to the high molecular weight compound by the reaction shown in equation (2) has the photosensitive aldehyde group, and it is thought that, as shown in the following reaction equation (3), a radical is formed by the photodecomposition of the aldehyde group and this radical is recombined with other polymer radicals to induce the cross-linking reaction.

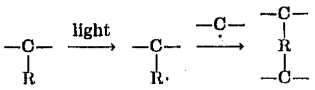

(3)

As mentioned above, it is considered that in case of using the aromatic polyaldehydes of the present invention, the consumption of the polymer radical as in the case of using the monoaldehyde is not observed and hence the rate of cross-linking and the number of cross-linked points are not reduced and the mechanical strength and the heat resistance of the cross-linked high molecular weight compound are remarkably improved.

Furthermore, the sensitizer is also introduced into the chain of the cross-link as the structure of —R—, a benzol ring such as

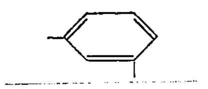

in the case of isophthalaldehyde, and the formation of the structure of the cross-link is considered to be an important factor in improving the mechanical properties and the heat resistance of the high molecular weight compound.

As mentioned above, the fact that when the aromatic polyaldehydes of the present invention are used to cross-link a high molecular weight compound by the action of light, the rate of cross-linking is greatly increased and the various properties, particularly the mechanical properties and the heat resistance of the high molecular compound, are remarkably improved as compared with conventional sensitizers, increases the range of high molecular weight compounds to which the present invention is applied and also greatly increases the value of the utilization of cross-linking by the action of light.

For example, a photo cross-linking process has the advantage that the cross-linking can be conducted continuously by using an inexpensive apparatus without using heat as compared with a thermal cross-linking method using a peroxide or the like and a cross-linking method by high energy radiation.

In order to effectively utilize the important features of a photo cross-liking method, cross-linking by light radiation must be conducted in a short period of time. By using conventional sensitizers, the rate of cross-linking sufficient to achieve these advantages and the improvements of various properties of the cross-linked high molecular weight compound cannot be obtained. On the other hand, by using the aromatic polyaldehydes of this invention, the high rate of cross-linking sufficient for effectively conducting continuous photo cross-linking can be obtained while improving the various properties, particularly the heat resistance, mechanical properties, and solvent resistance of the cross-linked high molecular weight compound. On considering these facts as mentioned above, it will be understood that the sensitizers of this invention are industrially very acceptable.

The present invention will be explained in more detail by referring to the following examples, although the invention is not intended to be limited to them only.

EXAMPLE 1

High pressure method polyethylene have a density of 0.918 and a melt index of 1.2 was mixed with 0.5 percent isophthaldialdehyde and a film having a thickness of 100 μ was prepared from the mixture by means of press molding.

The film was then exposed to a commercially available 400 watt high potential mercury lamp (main wave length: 300–360 mμ) at a distance of 20 cm at room temperature in air. The exposed film was not colored and the appearance thereof was almost the same as that of the original film. However, when the treated film was immersed in hot xylol, the film was not completely dissolved and insoluble gel was formed.

The weight percentage of the weight of the insoluble gel to the weight of the polymer before immersion in the solvent was defined to be the gel ratio and the change of the gel ratio was measured, the results of which are shown in Table 1. The maximum value was obtained after about 5–10 minutes. The gel ratio is not inferior to a gel ratio of 78 percent obtained by another cross-linking method, for example, a thermal cross-linking method (2.5 percent dicumyl peroxide was added and the mixture was heated for 1 hour to 150°C) and it will be understood how quickly the gel ratio was obtained.

Table 1

| Radiation time | Gel ratio (%) |
|---|---|
| 0 | 0 |
| 30 sec. | 26.5 |
| 1 min. | 53.0 |
| 5 min. | 76.5 |
| 10 min. | 85.0 |
| 30 min. | 83.0 |

EXAMPLE 2

A vinyl acetate-ethylene copolymer containing 45 percent vinyl acetate (Evaflex No. 15, trade name, made by Mitsui Polychemical Co.) was dissolved in xylol so that the concentration was 15–20 percent and then 0.5 percent of 2-chloroterephthaldialdehyde, based on the weight of the resin, was added to the solution. From the solution was prepared a film of a thickness of 100 μ by means of casting and the film was exposed to light as in Example 1.

The change of the gel ratio to the radiation time is shown in the following table.

Table 2

| Radiation time | Gel ratio (%) |
|---|---|
| 0 | 0 |
| 15 sec. | 8.5 |
| 30 sec. | 39 |
| 1 min. | 76 |
| 5 min. | 88 |
| 10 min. | 85 |
| 30 min. | 82 |

EXAMPLE 3

After mastificating a natural rubber (pale crepe) for about 5 minutes by means of a roll, 0.5 percent of isophthaldialdehyde was mixed with the rubber and then the mixture was dissolved in toluene. From the solution was prepared a film of a thickness of 100 μ by means of casting and the film was then exposed to light as in Example 1, whereby the film was immediately endowed with rubber elasticity, which indicated the start of cross-linking. On the other hand, in case of light exposing only the natural rubber without adding the sensitizer, the rubber was degraded by the light exposure, the rubber became sticky, and the rubber was not endowed with rubber-like elasticity. The change of the gel ratio to the radiation time is shown in the following table.

Table 3

| Radiation time | Gel ratio (%) |
|---|---|
| 0 | 0 |
| 30 sec. | 16 |
| 1 min. | 48 |
| 5 min. | 66 |
| 10 min. | 66 |
| 30 min. | 67 |

EXAMPLE 4

Silicone oil (Silicone Oil KF–99, trade name, made by Shinetsu Chemical Co.) was mixed with 1 percent of mesitylene trialdehyde and the mixture was light exposed as in Example 1. The viscosity of the liquid oil was increased by the radiation and the whole oil because a solid gel completely after about 5 minutes. When the product was immersed in a solvent, it was only swelled without being dissolved, which showed the formation of the network structure.

EXAMPLE 5

To an unsaturated polyester (a solution mixture of styrene and a polyester prepared from maleic anhydride, phthalic acid, and ethylene glycol), e.g., Nitron P–121 (trade name, made by Nitto Denki Kogyo K.K.) was added 1 percent of terephthalaldehyde and the liquid was light-exposed according to the manner of Example 1, whereby the viscosity was immediately increased and after 10 minutes, the liquid was completely converted into a hard solid.

EXAMPLE 6

A vinyl acetate-ethylene copolymer containing 45 percent vinyl acetate (Evalex No. 15, trade name, made by Mitsui Polychemical Co.) was dissolved in xylol and after adding thereto 0.5 percent of isophthaldialdehyde and 10 percent of tetraethylene glycol dimethacrylate, based on the weight of the resin, a film was prepared from the solution as in Example 2 and light-exposed.

The addition of the photoactive cross-linking agent increased the cross-linking effect and also increased the rate of the formation of the gel ratio as shown in Table 4.

Table 4

| Radiation time | Gel ratio (%) |
|---|---|
| 0 | 0 |
| 15 sec. | 15 |
| 30 sec. | 43 |
| 1 min. | 85 |
| 5 min. | 90 |
| 10 min. | 88 |

EXAMPLE 7

A mixture of styrene and 50% 6-vinylisophthaldialdehyde was dissolved in toluene in a monomer concentration of 30 percent and benzoyl peroxide in an amount of 0.5 percent based on the weight of the monomers was added to the solution, and the system was copolymerized for 5 hours at 75°C. By reprecipitating the polymer thus formed from methanol, the copolymer was purified and separated.

The copolymer was added to polystyrene (Stylon 666, trade name, made by Asahi Dow Co.) in an amount of 10 percent based on the weight of polystyrene and a film was prepared from the mixture and exposed to light as in Example 1.

A gel ratio of 70 percent was obtained by radiation for 5 minutes.

COMPARISON EXAMPLE 1

As in Example 2 and Example 6, a film was prepared from a mixture of a vinyl acetate-ethylene copolymer containing 45 percent vinyl acetate (Evaflex No. 15, trade name, made by Mitsui Polychemical Co.) and 0.5 percent by weight of a conventional sensitizer such as benzophenone, 2-methyl anthraquinone, isophthalic acid, benzoin, trichloroacetic acid, benzaldehyde, p-chlorobenzaldehyde, terephthalaldehydric acid, o-hydroxybenzaldehyde, p-nitrobenzaldehyde, and p-methylbenzaldehyde and the film was exposed to a 400 watt high potential mercury lamp for one minute. The gel ratios of the various cases were measured, the results of which are shown in the following table 5.

Table 5

| Sensitizer | Gel ratio (%) |
|---|---|
| Benzophenone | 48 |
| 2-Methylanthraquinone | 62 |
| Isophthalic acid | 8.0 |
| Benzoin | 13.0 |
| Trichloroacetic acid | 18.0 |
| Benzaldehyde | 45.8 |
| p-Chlorobenzaldehyde | 52.2 |
| Terephthalaldehydic acid | 49.8 |
| o-Hydroxybenzaldehyde | 42.0 |
| p-Nitrobenzaldehyde | 0.35 |
| p-Methylbenzaldehyde | 44.2 |
| Present invention: | |
| Isophthaldialdehyde | 76 |
| Mesitylene trialdehyde | 70 |

As shown in Table 5, it will be understood that the aromatic polyaldehydes of this invention gave a high rate of cross-linking as compared with other sensitizers, particularly aromatic monoaldehydes.

Amont the known sensitizers used in the comparison example, 2-methylanthraquinone and p-chlorobenzaldehyde gave rates of cross-linking near those obtained by the addition of the aromatic polyaldehydes of this invention, but it will further be understood as shown in Comparison Examples 2 and 3 that the mechanical properties and the heat resistance of these cross-linked materials were lower than those of the material produced using the present sensitizers.

COMPARISON EXAMPLE 2

Three kinds of films, each having a thickness of 100 $\mu$, were prepared from mixtures of high pressure method polyethylene having a density of 0.918 and a melt index of 1.2 and 0.5 percent by weight of each of isophthaldialdehyde, 2-methylanthraquinone, and p-chlorobenzaldehyde, respectively, and then each of the films was light exposed for various periods of time. From the films a sample of 1.0 cm × 7 cm was cut and the zero strength temperature thereof was measured. The zero strength temperature was the temperature at which the film was broken when a load of 20 g was suspended from an end of the sample film and the temperature was increased from room temperature at the rate of 3°C/min. The zero strength temperature shows the heat resistance of the film sample. The results are shown in Table 6.

Table 6

| Radiation time | (Zero strength temperature — °C) 0 | 1 min. | 5 min. | 10 min. | 30 min. |
|---|---|---|---|---|---|
| Isophthaldialdehyde | 98 | 124 | 163 | 170 | 176 |
| 2-Methylanthraquinone | 98 | 124 | 152 | 160 | 153 |
| p-Chlorobenzaldehyde | 98 | 105 | 123 | 140 | 152 |

By the test method, the zero strength of polyethylene before cross-linking was 98°C and that of polyethylene obtained by the thermal cross-linking (2.5 percent dicumyl peroxide was added and the mixture was subjected to press vulcanization for 1 hour at 150°C) was 163°C.

By comparing these results with the results obtained by the photo-cross-linking, it will be understood that the product obtained by using the isophthaldialdehyde of this invention had a higher heat resistance and achieved it more quickly as compared with the case of thermal cross-linking and also those of the case of using the conventional sensitizers.

COMPARISON EXAMPLE 3

As in Examples 2 and 6 and Comparison Example 1, three kinds of films, each having a thickness of 100 $\mu$, were prepared from mixtures of a vinyl acetate-ethylene copolymer containing 15 percent vinyl acetate (Evaflex No. 15, trade name, made by Mitsui Polychemical Co.) and 0.5 percent by weight of each of 2-methylanthraquinone, isophthaldialdehyde and p-chlorobenzaldehyde, respectively, and they were exposed to light.

The mechanical strength of the film at various radiation times was measured according to the method of JIK 6723, the results of which are shown in Table 7.

Table 7

| Radiation time | 0 | | 1 min. | | 5 min. | | 30 min. | |
|---|---|---|---|---|---|---|---|---|
| Mechanical characteristics / Sensitizer | * Kg/cm² | ** % | * Kg/cm² | ** % | * Kg/cm² | ** % | * Kg/cm² | ** % |
| Isophthaldialdehyde | 70 | 900 | 92 | 820 | 120 | 600 | 110 | 500 |
| 320 2-methylanthraquinone | | 70 | 900 | 52 | 800 | 35 | 400 | 24 |
| 500 p-chlorobenzaldehyde | | 70 | 900 | 60 | 850 | 45 | 650 | 32 |

* = Tensile stength **=Elongation

From the above results, it will be understood that when isophthaldialdehyde was used, the strength of the film was increased by the cross-linking and the reduction in strength was not observed even under exposure for a long period of time, while when 2-methylanthraquinone or p-chlorobenzaldehyde was used, the strength of the film was not improved and on the contrary was reduced.

COMPARISON EXAMPLE 4

When a film prepared from a mixture of a vinyl acetate-ethylene copolymer containing 45 percent vinyl acetate (Elvax, trade name, made by Mitsui Polychemical Co.) and 0.5 percent by weight of o-phthaldialdehyde was light exposed for 30 minutes, a product having a gel ratio of only 3 percent was obtained.

COMPARISON EXAMPLE 5

A mixture of 10g of dried polyvinyl alcohol having a polymerization degree of 1700 and 0.5 percent by weight of isophthaldialdehyde was dissolved in water to provide an aqueous solution having a polymer concentration of about 15 percent and then a film of 50 $\mu$ in thickness was prepared from the solution by means of casting.

The film obtained was subjected to light exposure according to the manner in Example 1 and when the film was treated in boiling water and the gel ratio was measured, almost no undissolved portion was observed and in the case of the product exposed for about 30 minutes, only cotton dust-like gel was formed. However, the measurement of the weight of the undissolved matters was impossible.

What is claimed is:

1. A composition capable of being cross-linked by exposure to light radiation having a wavelength of from 200 to 600 m$\mu$ consisting essentially of a high molecular weight material selected from the group consisting of polyethylene, polypropylene, ethylene-vinyl acetate copolymers, polystyrene, polyacrylates, polymethacrylates, polyvinlychloride, polyvinylidene chloride, polyacrylonitrile, polycarbonates, polyamides, polyurethanes, unsaturated polyesters, epoxy resins, xylol resins, ureaformaldehyde resins, melamine resins, natural rubbers, butyl rubbers, ethylene-propylene copolymer rubbers, styrene-butadiene copolymer rubbers, neoprene rubbers, alkyd resins, phenol resins, furan resins, a silicon resin, and polyvinylidene fluoride, and a photosensitive cross-linking agent consisting essentially of an aromatic polyaldehyde of the formula:

$$OHC — R — CHO$$

wherein R is a divalent benzene group, a substituted divalent benzene group, a divalent polycyclic aromatic ring, or a group selected from the group consisting of

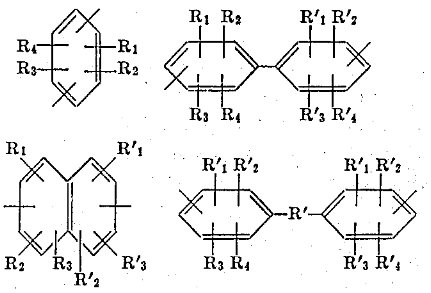

wherein $R_1$ through $R_4$ and $R'_1$ through $R'_4$ are each selected from the group consisting of a hydrogen atom, an alkyl group, a nitro group, a halogen atom and an aldehyde group, and wherein R' is a divalent group selected from the group consisting of an alkylene chain of 1 to 3 carbon atoms, a silicon of

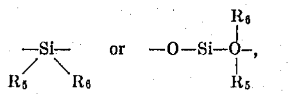

a phosphorus of

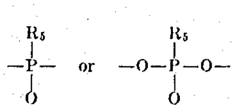

and a sulfur of $—SO_2—$, wherein $R_5$ and $R_6$ are selected from those groups which will not adversely affect the properties of said aromatic polyaldehyde, with the provision that the CHO— groups in said formula are not ortho with respect to each other, said high molecular weight material being capable of being cross-linked by the action of light in the presence of said photosensitive cross-linking agent.

2. The composition of claim 1 wherein said aromatic polyaldehyde is present in an amount of from 0.01 to 20 percent, by weight, based on the weight of said high molecular weight material.

3. A composition capable of being cross-linked by exposure to light radiation having a wavelength of from 200 to 600 m$\mu$ consisting essentially of a high molecular weight material selected from the group consisting of polyethylene, polypropylene, ethylene-vinyl acetate copolymers, polystyrene, polyacrylates, polymethacrylates, polyvinylchloride, polyvinylidene chloride, polyacrylonitrile, polycarbonates, polyamides, polyurethanes, unsaturated polyesters, epoxy resins, xylol resins, ureaformaldehyde resins, melamine resins, natural rubbers, butyl rubbers, ethylene-propylene copolymer rubbers, styrene-butadiene copolymer rubbers, neoprene rubbers, alkyd resins, phenol resins, furan resins, a silicon resin, and polyvinylidene fluoride, a photoactive cross-linking agent selected from the group consisting of N,N'-methylenebisacrylamide, N,N'-hexamethylenebismethacrylamide, 5-acrylamino-N-acrylocapromamaide, ethylene glycol dimethacrylate and triethylene glycol dimethacrylate, and a photosensitive cross-linking agent consisting essentially of an aromatic polyaldehyde of the formula:

OHC – R – CHO wherein R is a divalent benzene group, a substituted divalent benzene group, a divalent polycyclic aromatic ring, or a group selected from the group consisting of

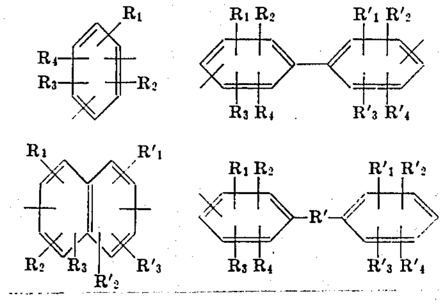

wherein $R_1$ through $R_4$ and $R'_1$ through $R'_4$ are each selected from the group consisting of a hydrogen atom, an alkyl group, a nitro group, a halogen atom and an aldehyde group, and wherein R' is a divalent group selected from the group consisting of an alkylene chain of 1 to 3 carbon atoms, a silicon of

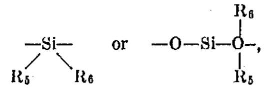

a phosphorus of

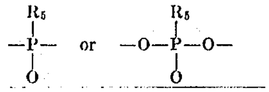

and a sulfur of $—SO_2—$, wherein $R_5$ and $R_6$ are selected from those groups which will not adversely affect the properties of said aromatic polyaldehyde, with the proviso that the CHO— groups in said formula are not ortho with respect to each other, said high molecular weight material being capable of being cross-linked by the action of light in the presence of said photosensitive cross-linking agent.

4. The composition of claim 3 wherein said photoactive cross-linking agent is present in an amount of from 1 to 50 percent, by weight, based on the weight of said high molecular weight material.

5. A composition capable of being cross-linked by exposure to light radiation having a wavelength of from 200 to 600 m$\mu$ consisting essentially of a high molecular weight polyethylene and isophthaldialdehyde.

6. A process for cross-linking a high molecular weight compound selected from the group consisting of polyethylene, polypropylene, ethylene-vinyl acetate copolymers, polystyrene, polyacrylates, polymethacrylates, polyvinylchloride, polyvinylidene chloride, polyacrylonitrile, polycarbonates, polyamides, polyurethanes, unsaturated polyesters, epoxy resins, xylol resins, urea-formaldehyde resins, melamine resins, natural rubbers, butyl rubbers, ethylene-propylene copolymer rubbers, styrene-butadiene copolymer rubbers, neoprene rubbers, alkyd resins, phenol resins, furan resins, a silicon resin, and polyvinylidene fluoride, consisting essentially of adding an aromatic polyaldehyde to said compound and subjecting the resulting mixture to light radiation having a wavelength of from 200 to 600 m$\mu$, said aromatic polyaldehyde being represented by the formula:

OHC — R — CHO wherein R is a divalent benzene group, a substituted divalent benzene group, a divalent polycyclic aromatic ring, or a group selected from the group consisting of

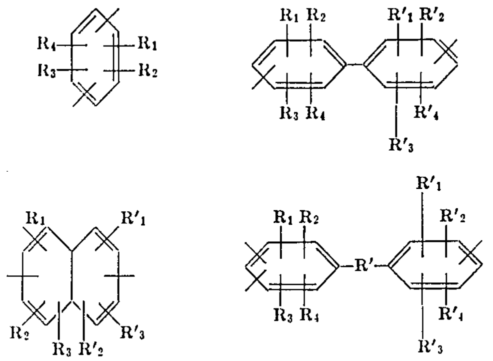

wherein $R_1$ through $R_4$ and $R'_1$ through $R'_4$ are each selected from the group consisting of a hydrogen atom, an alkyl group, a nitro group, a halogen atom and an aldehyde group, and wherein R' is a divalent group selected from the group consisting of an alkylene chain of 1 to 3 carbon atoms, a silicon of

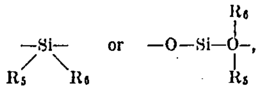

a phosphorus of

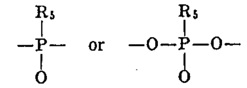

and a sulfur of $—SO_2—$, wherein $R_5$ and $R_6$ are selected from those groups which will not adversely affect the properties of said aromatic polyaldehyde, with the proviso that the CHO— groups in said formula are not ortho with respect to each other, said high molecular weight material being capable of being cross-linked by the action of light in the presence of said photosensitive cross-linking agent.

7. The composition of claim 3 wherein said aromatic polyaldehyde is present in an amount of from 0.01 to 20 percent by weight, based on the weight of said high molecular weight material.

8. The process of claim 6 wherein the amount of said aromatic polyaldehyde added to said high molecular weight compound is from 0.01 to 20 percent by weight, based on the weight of said high molecular weight compound.

* * * * *